UNITED STATES PATENT OFFICE.

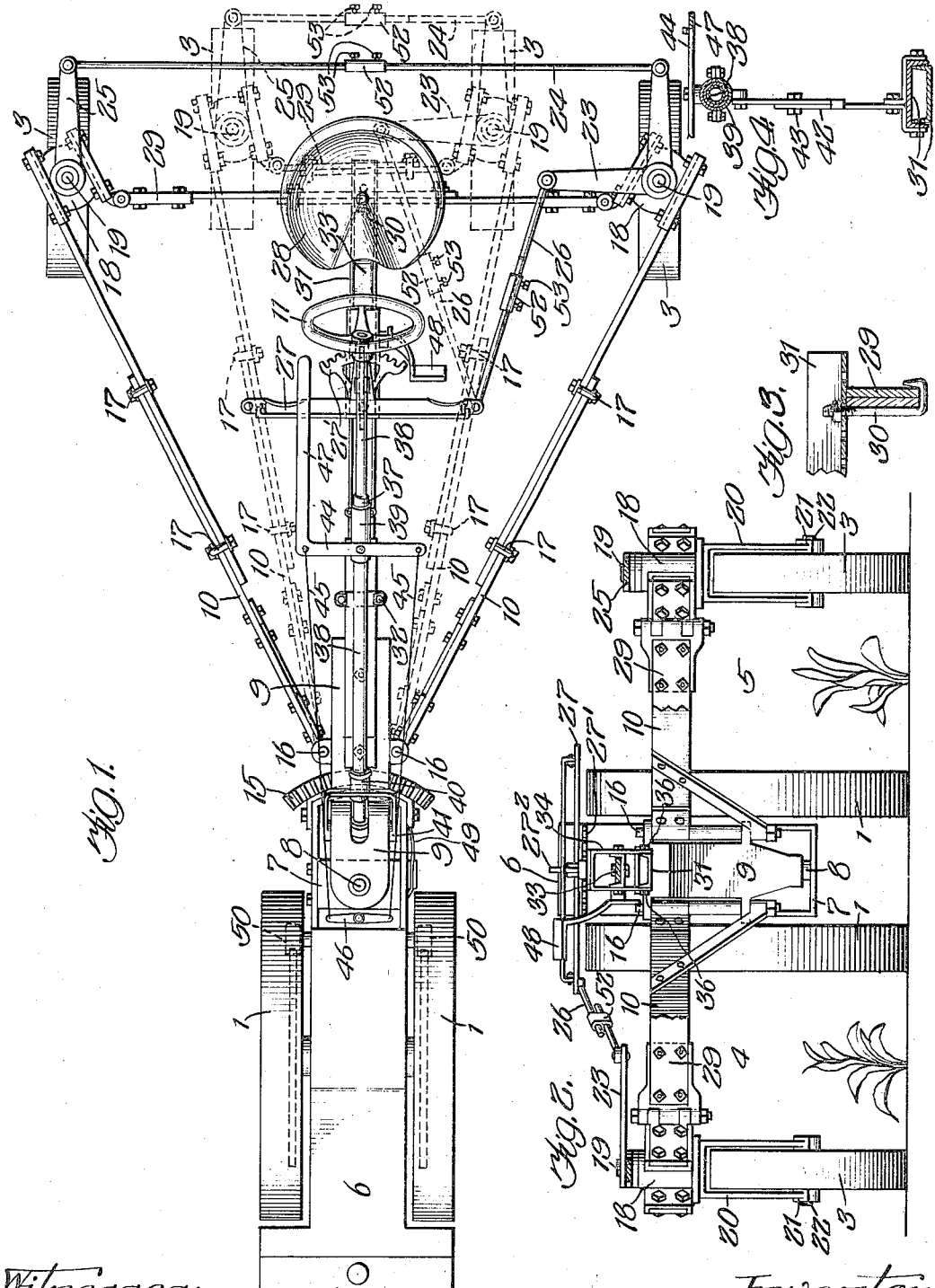

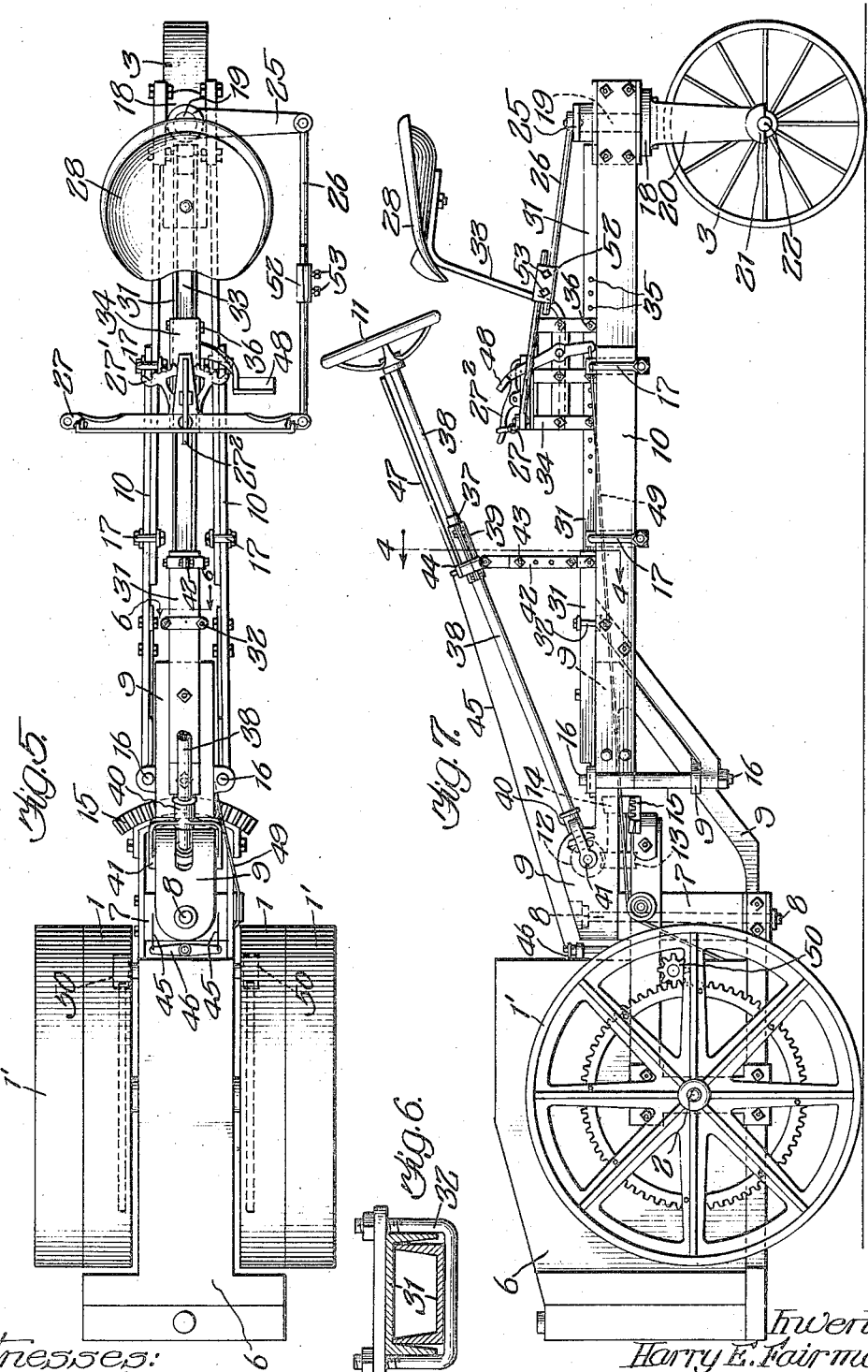

HARRY E. FAIRMAN, OF DAVENPORT, IOWA.

VEHICLE.

1,210,056.

Specification of Letters Patent.

Patented Dec. 26, 1916.

Application filed July 13, 1914. Serial No. 850,580.

*To all whom it may concern:*

Be it known that I, HARRY E. FAIRMAN, citizen of the United States, residing at Davenport, in the county of Scott and State of Iowa, have invented a certain new and useful Improvement in Vehicles, of which the following is a full, clear, concise, and exact description, reference being had to the accompanying drawings, forming a part of this specification.

My invention relates to self-propelled vehicles and is of particular service in connection with that class of self-propelled vehicles that include tractors, though it is to be understood that my invention is not to be limited to tractors as the invention is adaptable to other self-propelled vehicles.

It is one general object of my invention to provide a construction in which the power plant of the vehicle constitutes a portion of a unitary structure that includes the steering wheels of such vehicle, the power plant being mounted so as to be moved bodily with the steering wheels irrespective of the planes of rotation to which the steering wheels are shifted.

In one embodiment of the invention two closely approached steering wheel elements are employed which are fixedly coupled, by which arrangement the presence of a differential gearing between the engine and steering wheels is avoided. In the preferred form of the invention the power plant and the steering wheels are located at the forward portion of the vehicle, by which forward arrangement the direction of travel of the vehicle is very readily controlled by the operator.

My invention has for another of its objects the provision of a vehicle having vehicle wheels at its forward and rear ends, at one of which portions of the vehicle there is provided a pair of vehicle wheels in combination with means for varying the lateral spacing between the wheels of this pair so as to vary the gage of the path followed by this pair of vehicle wheels. There is preferably also present means for retaining only one of said pair of wheels when it is desired to reduce the width of the path followed thereby to the minimum. By means of my invention the steering wheel may be confined to travel between adjacent rows of plants whereas the pair of adjustable wheels may be relatively adjusted so as to travel either between these rows or so as to embrace them as circumstances may require.

I will explain my invention more fully by reference to the accompanying drawings showing the preferred embodiment thereof and in which—

Figure 1 is a plan view of a machine embracing the invention; Fig. 2 is a rear view of the machine illustrated in Fig. 1; Fig. 3 is a sectional view; Fig. 4 is a sectional view on line 4, 4 of Fig. 7; Fig. 5 is a plan view of the vehicle with one of the rear trailing wheels substituted for a pair of such wheels; Fig. 6 is a sectional view on line 6, 6 of Fig. 5; and Fig. 7 is a side view of the structure illustrated in Fig. 5.

Like parts are indicated by similar characters of reference throughout the different figures.

The tractor illustrated in Figs. 1 and 2 includes four wheel elements, two of the wheel elements 1 together constituting steering wheels since these two elements are desirably rigidly secured to a common axle 2 and are so closely approached as to render differential movement between the same unnecessary for the purpose of steering. The remaining wheel elements 3 are trailing wheels which serve in coöperation with the steering wheels to determine the direction of travel of the vehicle and also to carry or effect the travel of the load. These wheels 3 obviously also suitably serve to establish equilibrium for the steering wheels in the particular embodiment of the invention illustrated. The steering wheel members 1 are desirably placed at the forward portion of the vehicle and while these members are shown as being in fixed relation owing to their proximity I do not wish to be limited to such fixed relation. As the invention is embodied the two closely approached steering wheels 1 may travel between adjacent plant rows (indicated at 4 and 5 in Fig. 2) and the trailing wheels 3 may travel either outside of these adjacent plant rows so as to embrace the same as indicated in Figs. 1 and 2 in full lines or, being suitably adjusted, may travel between said adjacent plant rows, as indicated by dotted lines in Fig. 1. By the mechanism illustrated one of the wheels 3 may be eliminated as indicated in Fig. 5 whereby the remaining wheel 3 may be positioned to travel in the middle of the path followed by the two closely approached steering wheels 1, this remaining wheel 3 being then brought into substantial alinement with the middle of the vehicle. Where one of the wheels 3 is omitted the pair of steering wheels 1 is preferably widened by adding wheel elements $1^1$ whereby the base of the vehicle is sufficiently increased to enable the vehicle to be stable.

The engine or motor which I preferably employ is an internal combustion engine indicated at 6, this engine being in suitable driving connection with the wheels 1 that thus constitute not only closely approached steering wheels but traction wheels as well. The engine is mounted upon a truck 7 pivotally connected by a bolt 8 with rigid frame members 9 projecting forwardly and downwardly from the horizontal framework members 10 which are in normally fixed relation with the frame members 9. The engine supporting truck 7 is shifted about the vertical axis afforded by the bolt 8, in steering the vehicle, by means of suitable steering mechanism including a steering wheel 11 in driving relation with a pinion 12 (Fig. 7) that is in mesh with a worm gear 13 that is in fixed relation with a pinion 14 that engages a segmental rack 15, this segmental rack being mounted upon or carried by the truck 7. The elements 11, 12, 13 and 14 are themselves mounted upon the framework 9 with which the frame members 10 have pivotal connection at their forward ends by means of bolts 16. The frame members 10, by means of the hinge structures shown at 16, are swingingly mounted upon the framework 9.

Each frame member 10 is formed in sections adjustable longitudinally thereof whereby the lengths of said frame members 10 may be determined, the adjusted lengths of said frame members being secured by means of clamping U-bolts 17. The rear ends of the frame members 10 are bolted to the vertically disposed bearings 18 in which the vertical shafts 19 turn, these shafts 19 projecting upwardly from the brackets 20, each bracket 20 and the shaft 19 it carries being in fixed relation. The lower ends of the brackets 20 are provided with journals 21 for receiving the horizontal axles or shafts 22 that are individual to the rear wheels 3. One of the vertical axles 19 is in fixed connection with the elbow of a bell crank lever 23. One of the arms of this bell crank lever is connected by a rod 24 with an arm or lever 25 that is connected with the remaining vertical shaft 19. The other arm of the bell crank 23 is connected by a rod 26 with a centrally pivoted foot lever 27 which is located to be within the reach of the foot of the operator who may occupy the seat 28 so as to be also within reach of the steering wheel 11. The operator, by turning the foot lever 27, may shift the rod 26 to cause the vertical shafts 19 to turn and thereby occasion that turning movement of the brackets 20 which will place the trailing wheels 3 in desired lines of travel. The foot lever 27 may carry a segmental rack $27^1$ for coöperation with a holding pawl $27^2$ to maintain the lever 27 in any position to which it may be swung. The journals 18 are desirably connected by means of a strut structure 29 so as to maintain these journals selected distances apart, a hook bolt 30 serving to secure the strut 29 in fixed relation to a central beam 31 whereby the trailing wheels are maintained in suitable relation with the middle longitudinal line of the vehicle.

The beam 31 is desirably composed of sections that are adjustable longitudinally of the beam whereby the effective length of the beam may be adjusted. The seat 28 is mounted upon the rear section of this beam so that its position may be adjusted fore and aft by moving this rear beam section forwardly or rearwardly as required. The sectional formation of the beam is clearly illustrated in Fig. 6 where I have illustrated symmetrically arranged channel bars, one received in the other. When the length of the beam is to be adjusted the U-bolts 32 are loosened and after the beam has been adjusted to the desired lengths these bolts are tightened whereby the selected adjustment is secured. The forward section of the beam 31 is desirably rigidly secured to the frame 9 whereby the beam constitutes, in effect, a continuation of said frame. The seat 28 may be of the usual kind employed in agricultural implements, the seat standard 33 being mounted upon a bracket structure 34 (upon which the holding pawl $27^2$ is also mounted) which bracket in turn is mounted upon the rear section of the beam 31. It is thus obvious that when the length of the beam is adjusted that the seat 28 is correspondingly shifted toward or from the vehicle. The position of the seat upon the beam may also be adjusted by the provision of holes 35 in the rear section of the beam through which the bolts 36 may be passed, the bolts being loosened and inserted in new holes whenever the position of the seat upon the rear beam section is to be adjusted. The steering shaft of the steering wheel 11 is formed in telescoping sections 37 and 38 whereby the effective length of this shaft is variable, any selected adjustment of the shaft length being secured by means of a clamp sleeve 39. The lower end of the outer shaft section 38 is journaled in the stem 40 of a bracket 41, power being transmitted from the steering shaft to the pinion 12. It is understood that the length of the shaft is to be suited to the position of the seat 28 and the convenience of the operator. When there is a readjustment of the seat and the length of the steering shaft it is desirable to adjust the angularity of said shaft, to which end I have provided the bracket or stirrup 41 which is journaled to swing at its lower end upon the framework 9. The angular position of the steering shaft is maintained by a strut 42 (Figs. 4 and 7) which is attached at one end to the steering shaft structure and at the other end to the forward section of the beam 31. This strut is made in two sections that are adjustable longitudinally of the strut whereby the length of the strut may be altered to determine the angle at which the shaft is to be disposed, the adjusted length of the strut 42 being maintained by the clamping bolt 43.

The steering wheel shaft structure has mounted thereupon a centrally pivoted lever 44 connected on both sides of its mounting by cords 45 with a rocker 46 that is connected by suitable means with mechanism for determining the direction of rotation of the engine. The lever 44 has an operating handle 47 within the reach of the operator while upon his seat 28. A lever 48 is within the reach of a foot of the operator and, through the intermediation of the cord 49, serves to throw the transmission clutch (that is to couple the engine 6 with the initially driven pinions 50) into and out of action.

When it is desired to change the lateral spacing between the wheels 3, the sections of each side frame member 10 are uncoupled by loosening the clamping U-bolts 17 whereafter the length of these frame members 10 may be adjusted to suit the spacing that is to intervene between the wheels 3. After the wheels 3 have been suitably spaced apart the clamp U-bolts 17 are again clamped to maintain the frame members 10 intact. When the spacing between the wheels 3 is varied it is necessary to change the effective length of the rod 24 and also the effective length of the rod 26. To this end the couplers 52 are employed to unite adjustable sections of these rods, these couplers being equipped with set bolts 53 for engaging the rod sections to maintain the selected relative adjustment thereof. When a single wheel 3 is to be substituted for the pair of wheels 3, that wheel 3 which is individual to the bell crank lever 23 is disconnected from the associate frame member 10 and rod 26, the rod 24 being also disconnected from the arm 25 whereafter the disconnected frame member 10 is connected with the journal 18 pertaining to the retained wheel 3 as indicated in Figs. 5 and 7, the rod 26 being also connected with the outer end of the arm 25 with the result illustrated in the last mentioned figures.

From the foregoing description it will be apparent that I have provided a vehicle having wheels whose lateral spacing may be varied, the central beam 31 in coöperation with the hook bolt 30, the side frame members 10, and the frame 9 producing a very rigid structure when the selected adjustments have been secured by the various clamping devices illustrated and while I prefer to employ the central beam 31 formed in adjustable sections whereby the effective length of the beam may be adjusted I do not wish to be limited to this means for enabling me to vary the position of the seat 28 with respect to the balance of the structure.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A vehicle having two side frame members extending between forward and rear portions of the vehicle and adjustable laterally of the vehicle with respect to each other and whose effective length is adjustable; and vehicle wheels supporting said members and adjustable therewith.

2. A vehicle having two side frame members that converge forwardly; a frame with which the forward ends of these frame members are connected; a beam extending rearwardly from this frame; vehicle wheels upon which the rear ends of the frame members are mounted; and a strut serving to space said wheels apart and connected with the rear end of the beam.

3. A vehicle having two side frame members; a frame with which the forward ends of these frame members are swingingly connected; a beam extending rearwardly from this frame; vehicle wheels upon which the rear ends of the frame members are mounted; and a strut serving to space said wheels apart and connected with the rear end of the beam, said frame members and strut having their effective lengths adjustable whereby the spacing between said vehicle wheels may be regulated.

4. A vehicle having two side frame members; a frame with which the forward ends of these frame members are swingingly connected; vehicle wheels upon which the rear ends of the frame members are mounted; and a strut serving to space said wheels apart, said frame members and strut having their effective lengths adjustable whereby the spacing between said vehicle wheels may be regulated.

In witness whereof, I hereunto subscribe my name this 9th day of July A. D., 1914.

HARRY E. FAIRMAN.

Witnesses:
DICK BRADEN,
RAY MEACHAM.